Patented Oct. 28, 1930

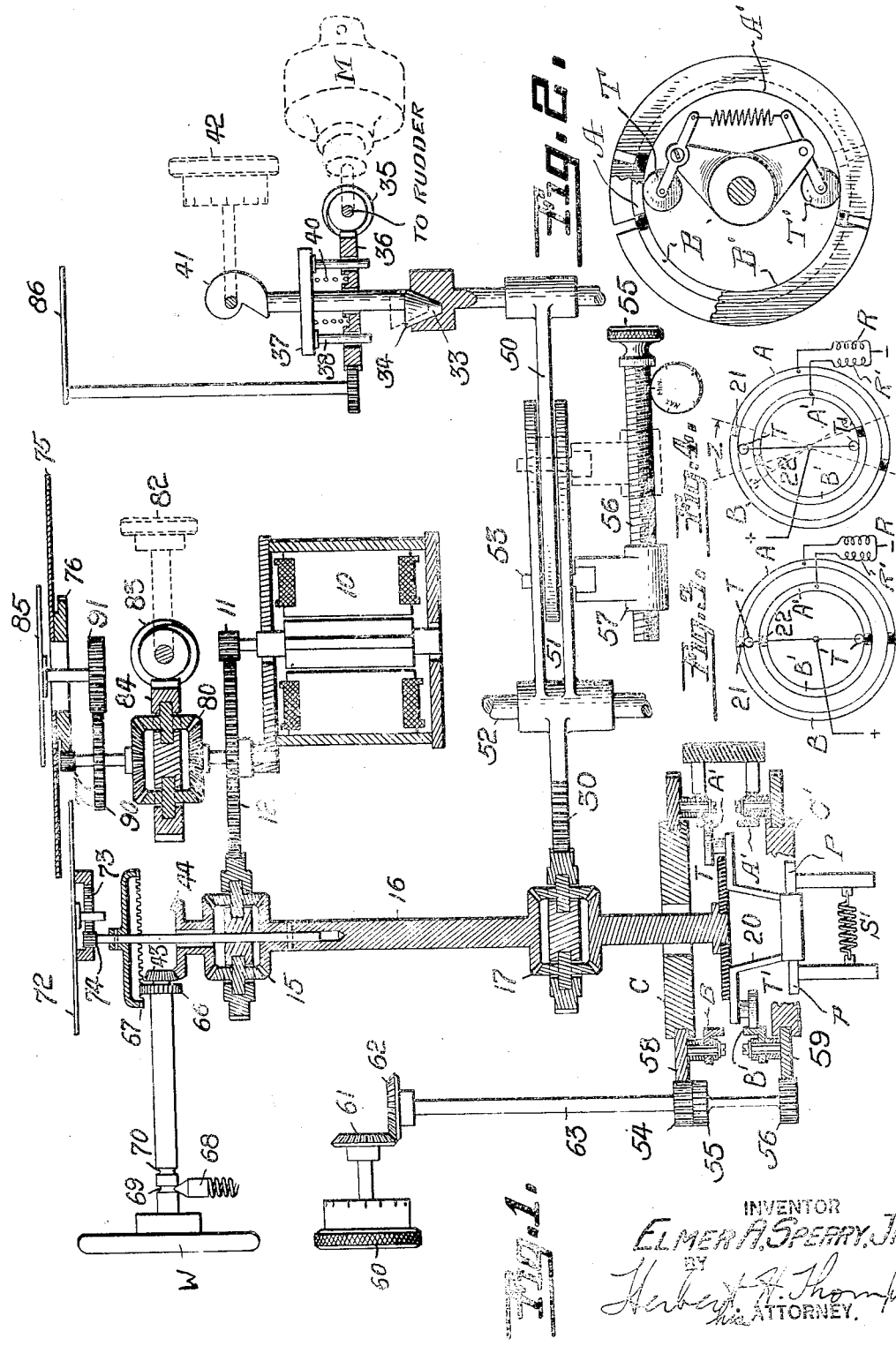

1,779,991

UNITED STATES PATENT OFFICE

ELMER A. SPERRY, JR., OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

AUTOMATIC PILOT

Application filed August 8, 1927. Serial No. 211,380.

This invention relates to automatic steering devices for dirigible craft, and more particularly of the type adapted to be controlled from a gyro compass as a baseline. Fundamentally, these devices comprise a two-part contactor mechanism, one of which parts is controlled from the compass to respond to deviations from course, and thus energize a motor for actuating the rudder in the desired direction to counteract the deviation of the craft from course and return said craft to the course.

In order to hold the vessel closely to its course, it has been the practice to cause the rudder-operating motor to be energized upon very slight deviations of the craft from course. While this has resulted in a sensitive steering device, it also gave rise to excessive operation of the steering gear in rough weather and excessive running of the motor to such an extent that the entire system was threatened with a breakdown, and, in any case, tended to shorten the life of the apparatus. It is the principal object of my invention, therefore, to provide means whereby the sensitivity of the steering control may be varied so that, for example, in rough weather when the vessel yaws considerably to either side of its course, and there would ordinarily be a tendency to operate the steering gear excessively, I may so adjust my steering control that said control is rendered unresponsive to such yawing movements. This adjustment I term the "weather adjustment" or "rudder activity adjustment" and accomplish the same purpose but by a much simpler mechanism and in a much more effective manner than has heretofore been proposed.

It is a further object of my invention to provide means which will indicate clearly and in a magnified degree the position of the rudder, of the electrical contact mechanism which controls the steering motor, and also indicate the course.

Still other objects and advantages of this invention will be disclosed in the following detailed description thereof.

Fig. 1 is an assembly view, partly sectioned and somewhat diagrammatic, of an automatic steering control embodying the principles of my invention.

Fig. 2 is a plan view, with parts broken away, showing my novel contactor mechanism.

Figs. 3 and 4 are diagrammatic views of the contactor mechanism illustrating the principles of operation of my novel weather adjustment.

Referring to the drawings, I have illustrated a repeater motor 10 adapted to be actuated from a master gyroscopic compass which transmits all of its movements instantaneously to said repeater motor, said repeater motor operating through gearing, such as 11, 12 to actuate the contactor differential 15, which operates a shaft 16 through a differential 17, whose function will be described hereinafter, to operate the trolley mechanism 20 in the form of a carriage supporting the trolleys T—T'. Said trolleys may be pressed by a spring S into engagement with contact rings A B, A' B'. Said contactor rings are each sub-divided into two parts A, B and A', B' separated by insulation segments 21 and 22. Said rings are mounted in parallel planes with their axis coincident (one above the other in superimposed planes, in the drawings) and the trolleys T—T' are also mounted on carriage 20 in corresponding planes, the trolley T cooperating with contact ring A B and the trolley T' with the contact ring A' B'. Segments A and A' are live, while B and B' are dead and may be mere extensions of insulation segments 21, 22.

If the upper and lower contact rings are initially positioned so that the contact segments 21 and 22 are in alignment, trolley T rests upon contact segment 21 of the upper contact ring, while trolley T' rests upon the contact segment 22 of the lower contact ring. It will thus be seen that any deviation of the craft from course will cause repeater motor 10 to be actuated to rotate carriage 20 and move trolley T or T', depending upon the direction of deviation, out of engagement with the insulation segment 21 or 22 and into engagement with live contact A or A' respectively to energize the steering motor M in one direction of the other, said motor being a reversible motor with two oppositely wound field coils. The circuit through one field coil lies through trolley T, live contact A and coil R of a relay controlling one field of the motor, while the circuit through the other field coil of said motor lies through the other live contact segment A' of the other contact ring and coil R' of the relay controlling the other field of the motor.

The rudder, being operated by the motor, in turn operates a follow-up mechanism which is introduced from shaft 32 driven directly or indirectly from the rudder actuating motor M. Heretofore, in practice the rudder follow-up has rotated the contact rings so that said rings will follow the movement of the trolleys. I here propose, however, to cause said follow-up to rotate the trolleys in the opposite direction to that in which said trolleys were rotated by the repeater motor, so as to bring said trolleys back to the insulation segments of the contact rings which remain in relatively fixed or adjusted position. For this purpose I have interposed the differential 17 so that the repeater motor operates through one side thereof through shaft 16, while the rudder operates through another side thereof by way of gearing 30—31. Interposed between the rudder and the differential 17 are two adjustments, the initial rudder adjustment and the rudder ratio adjustment. The functions of these adjustments have been fully described in my copending application, Serial No. 630,853, filed April 9, 1923, and may be briefly stated as follows:

The initial rudder adjustment provides a lost motion between the rudder follow-up 32 and the trolleys so as to give the rudder a greater or lesser overthrow to increase the righting torque applied to the craft. For this purpose I have shown said adjustment as comprising the lost motion cone slot 33 and offset cone 34 cooperating therewith to provide greater or lesser lost motion as said cone is raised or lowered into said slot, said cone being driven from shaft 32 through suitable gearing, such as 35—36, and vertically operable carriage 37 to which said cone 34 is fixed. Said carriage 37 has a vertical movement within gear 36 by means of pins 38 operating in slots in said gear. Carriage 37 may be normally pressed by means such as spring 40 to move cone 34 out of slot 33, but the position of said cone within said slot may be varied by means such as an adjusting cam 41 operated from an adjusting knob 42, said cam operating against said carriage 37 to lower the same against the action of spring 40.

The rudder, therefore, drives the follow-up to the trolleys through the said initial rudder adjustment with greater or lesser lost motion and actuates a member 50 forming part of the rudder ratio adjustment. This adjustment is for the purpose of causing more or less rudder to be applied for a given deviation of the craft from its course, because certain vessels, depending upon their specific characteristics, require a greater or lesser rudder to operate them through the same angular distance than do other vessels. For this purpose I vary the amount of actuation of the trolleys corresponding to the given rate and degree of actuation of the rudder. I accomplish this by causing said link 50 to operate a pair of links 51 forming one arm of a lever pivoted at 52, the other arm of said lever carrying the gearing 30 which drives the differential 17 and the trolley T. The effective arm of lever 51 may be varied by adjusting the position of a pin 53 extending through link 50 and links 51 to vary the fulcrum point at which the torques are transmitted from link 50 to links 51. The pin 53 operates in corresponding slots in links 50 and 51 and may be moved within said slots by rotating an adjusting knob 55 at the end of a screw 56 carrying a traveling nut 57 to which said pin 53 is attached. By the above described means the rudder operates through the initial rudder adjustment and the rudder ratio adjustment to cause trolleys T to move in the reverse direction to that caused by repeater motor 10.

If the contact rings are so positioned that the insulation segments 21—22 are in alignment, then even a slight deviation from course will cause trolley T or T' to move off said insulation and into engagement with contact A or A' to energize the respective field of the motor to operate the rudder. In rough weather, however, as hereinbefore explained, the vessel yaws continuously and to a considerable degree to either side of the course and if the automatic steering device attempted to counteract such yawing movement it would cause undue operation of the steering gear with consequent danger of damage thereto. I, therefore, provide my novel weather adjustment whereby a simple adjustment will render the automatic steering device unresponsive to any predeterminal degree of jaw, that is to say, within any desired limits the automatic steering device will not operate. To this end, I provide a means for increasing the relative angle that the trolleys must move in order to move off the dead section, that, I adjust the effective width of the dead portion. For this purpose I have caused each of said contact rings A B and A' B' to be mounted upon respective carriages C—C', said carriages being provided with annular gears 58—59 adapted to be driven in opposite directions by operation of a knob or handwheel 60 operating through gearing 61—62 to drive a shaft 63 carrying gearing meshing with annular gears 58—59. Gear 54 meshes with gear 58 to drive carriage C. Gear 54 also meshes with gear 55 on the same shaft as gear 56 to drive carriage C' in the opposite direction with respect to carriage C. Referring to the diagram of Fig. 4 it will be observed that operation of knob 60 to move the contact rings in opposite directions and hence move insulation segments 21—22 out of alignment causes the formation of a dead space of greater or lesser proportions within which trolleys T—T' may operate without causing actuation of the steering gear. Thus, for example, it will be seen that trolley T may operate within the angle Z comprising the distance between the outer edges of insulation segments 21—22 without energizing the steering motor, because it is only after moving beyond said angle Z in a clockwise direction in the drawings that trolley T can engage its live segment A. Similarly, it is only after beyond said angle Z in a counterclockwise direction that trolley T' can engage its live contact A'. It will thus be seen that by a very simple structure involving a very simple adjusting movement, I can at will separate the insulation segments 21—22, that is, move them out of alignment to any desired degree to render the steering mechanism ineffective within any desired angle of movement. In this manner I have provided an effective and simple weather adjustment for cutting out the operation of the steering motor within predetermined limits whenever it is threatened with excessive operation. I term this structure the rudder activity adjustment.

I have provided also means whereby a new course may be set by hand. For this purpose I have provided the hand adjusting wheel W mounted for longitudinal movement so that in its initial position a gear 43 meshes with a gear 44 operating through the contactor differential 15 to set the trolleys T—T' at will and thus set a new course. In its outer position handwheel W moves gear 43 out of engagement with gear 44 so that the repeater motor is no longer effective to operate the trolleys and hence the gyro compass control is ineffective, and instead a gear 66 engages a gear 67 to drive through shaft 16 to the trolleys. This is, therefore, entirely a hand control. The handle W may be held in its hand and gyro positions by the usual detent 68 co-acting with grooves 69 and 70.

The position of the trolleys T—T' on their contact rings may at all times be read upon a dial 72 which gives an amplified reading of the trolley position due to the multiplying gearing 73—74, the latter being fixed to operate with the shaft 16 carrying the trolleys. Current may be led to the trolleys by brushes P spring-pressed by a spring S' into engagement therewith.

A reading of the course may also be obtained upon the dial 75 operated through reduction gearing 76—77, the latter gear operated from the repeater motor 10 through a synchronizing differential 80. Said differential may also be employed for synchronizing the indication of the repeater motor with the master gyroscopic compass by means such as a synchronizing knob 82 operating through suitable gearing 83—84 into said synchronizing differential 80. A vernier or magnified indication of the compass reading may be indicated by a pointer 85, which operates through much larger angular distances than card 75 because gearing 90, 91 is multiplying gearing as compared with reduction gearing 76, 77. The position of the rudder may be indicated by a pointer 86 operated from the follow-up of the rudder through means, such as the gearing 36.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic steering device for dirigible craft having a compass, a rudder and a motor for operating said rudder, a plurality of contact members for controlling said motor including a trolley and a plurality of concentric contact rings each having live and dead portions with which said trolley cooperates, means whereby said trolley is controlled by said compass, and means for adjusting the relative positions of said rings whereby the amount of dead space is varied.

2. In an automatic steering device for dirigible craft having a compass, a rudder and a motor for operating said rudder, a plurality of contact members for controlling said motor including a trolley and a plurality of closed contact rings each having live and dead portions with which said trolley cooperates, means whereby said trolley is controlled by said compass, and means whereby rotation of said rings in opposite directions varies the amount of dead space.

3. In an automatic steering device for dirigible craft having a compass, a rudder and a motor for operating said rudder, a plurality of contact members for controlling said motor including a trolley and a plurality of superimposed contact rings each having live and dead portions with which said trolley cooperates, means whereby said trolley is controlled by said compass, means whereby rotation of said rings in opposite directions varies the amount of dead space, and a single means for simultaneously actuating said rings in opposite directions.

4. In an automatic steering device for dirigible craft having a compass, a rudder and a motor for operating said rudder, a plurality of contact members for controlling said motor including a pair of concentric contact rings each having live and dead portions, and a pair of trolleys one in engagement with each ring, means whereby said trolleys are controlled from said compass, and means whereby the degree of disalignment of the dead portions of said rings may be varied to vary the weather adjustment.

5. In an automatic steering device for dirigible craft having a compass, a rudder and a motor for operating said rudder, electrical contact means for controlling said motor, means governed from the compass for giving an indication of the degree of actuation of said contact means, and means for indicating the degree of resulting actuation of the rudder.

6. In an automatic steering device for dirigible craft having a compass, a rudder and a motor for operating said rudder, means controlled by said compass and said rudder for controlling said motor, a coarse indicator, a fine indicator, means whereby said compass actuates said indicators, a rudder position indicator, and means actuated from said motor for actuating said rudder position indicator.

7. In an automatic steering device for dirigible craft having a compass, a rudder, a reversible motor for operating said rudder, a plurality of contact members governed from the compass for controlling said motor, including a pair of concentric contact rings each having live and dead portions, a pair of trolleys one in engagement with each ring, each trolley and its cooperating ring controlling a circuit through said motor, and means whereby the degree of disalignment of the live and dead portions of said rings may be varied to vary the weather adjustment.

8. In an automatic steering device for dirigible craft having a compass, a rudder, a reversible motor for operating said rudder, a plurality of contact members governed from the compass for controlling said motor, including a pair of concentric contact rings each having live and dead portions, a pair of trolleys one in engagement with each ring, each trolley and its cooperating ring controlling a circuit through said motor, means whereby the degree of disalignment of the live and dead portions of said rings determines the amount of dead space, and means whereby said rings are simultaneously actuated in opposite directions to vary the amount of dead space.

9. In an automatic steering device for dirigible craft having a compass, a rudder, a motor for operating the rudder, a plurality of contact members for controlling said motor, including trolleys and contact rings having live and dead portions with which said trolleys cooperate, means whereby said trolleys and rings are controlled jointly by said compass and rudder, and means for adjusting the effective width of said dead portions whereby the sensitivity of the control may be varied.

In testimony whereof I have affixed my signature.

ELMER A. SPERRY, JR.